United States Patent Office 3,303,162
Patented Feb. 7, 1967

3,303,162
LIGHT-STABILIZED POLYOLEFIN COMPOSITIONS CONTAINING A NICKEL SALT OF A SCHIFF BASE AND A TEREPHTHALATE ESTER
Charles H. Fuchsman, Cleveland Heights, Ohio, assignor to Ferro Corporation, Cleveland, Ohio, a corporation of Ohio
No Drawing. Filed Dec. 31, 1964, Ser. No. 422,575
9 Claims. (Cl. 260—45.75)

This invention relates broadly to the stabilization of polyolefins against the deleterious effects of sunlight or other sources of ultra-violet radiation. More particularly the invention deals with improved light stabilizers for polyolefins, with polyolefin compositions stabilized therewith, and with methods of preparing the said compositions.

Polyolefin materials are finding a wide and expanding commercial use. The products manufactured therefrom are chemically relatively inert and in general have many desirable physical properties. However, such products, on exposure to sunlight or to other sources of ultraviolet light, are subject to rapid degradation characterized by discoloration, brittleness, loss of extensibility, and ultimately, loss of strength.

There have been numerous attempts by those working in the art to overcome such undesirable deterioration. Accordingly it has become standard practice to incorporate various additives into the resin composition in an effort to stabilize it against such deleterious effects of light. However, many additives which otherwise function satisfactorily suffer from the disadvantage of causing the resulting product to be opaque and consequently of limited utilization. Other well known stabilizing materials are incompatible with many polyolefin resins and will leach out of the articles manufactured therefrom. Furthermore most of the previously known stabilizers do not protect the composition adequately for many intended applications.

Accordingly, it is an object of this invention to provide an improved polyolefin composition having increased resistance to ultra-violet light.

It is a further object to provide a polyolefin composition having incorporated therein a nickel derivative of a Schiff base as a light stabilizer therefor.

A further object is to provide a method of making an improved light-stabilized polyolefin composition.

Other objects will become apparent as the description proceeds.

The foregoing and related objects are achieved with a resin composition comprising a polyolefin and stabilizing amounts of nickel derivatives of certain Schiff bases, such as salicylidene-4-chloroaniline.

The invention also involves the combination of the foregoing described nickel derivatives of Schiff bases with two additional groups of secondary ultra-violet light stabilizers. These groups include (1) a substituted phenol ester of an aromatic dicarboxylic acid as exemplified by bis(p-nonylphenyl)terephthalate and (2) certain organic phosphorus compounds such as ethylene phosphite, tridecyl phosphite and various phosphonates.

The polyolefins employed in this invention are directed primarily to polymers and copolymers of straight chain monomers, said monomers having the formula $C_nH_{2n}$ wherein $n$ is an integer from 2 to 4.

As stated previously the nickel compounds are salts or complexes of certain Schiff bases in which the Schiff base is essentially that formed by the condensation of salicyl-aldehyde and a substituted aromatic amine such as substituted aniline or amino pyridine as illustrated by the following general formula:

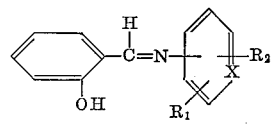

wherein $R_1$ as well as $R_2$ are selected from the group consisting of hydrogen, halogen, alkyl, alkoxy and carboalkoxy and X is CH or N.

Examples of Schiff bases employed in the present invention within the scope of the above formula are as follows:

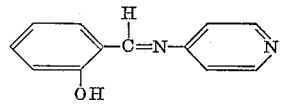
Salicylidene-4-aminopyridine

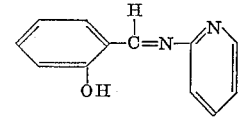
Salicylidene-2-aminopyridine

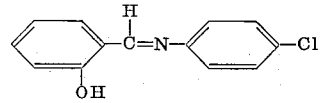
Salicylidene-4-chloroaniline

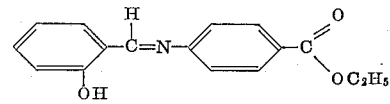
Salicylidene-4-carboethoxyaniline

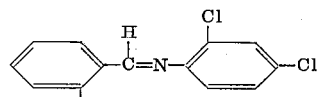
Salicylidene-2,4-dichloroaniline

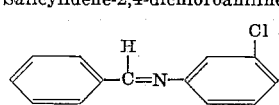
Salicylidene-3,5-dichloroaniline

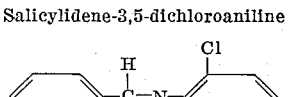
Salicylidene-2,5-dichloroaniline

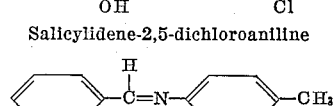
Salicylidene-4-methylaniline

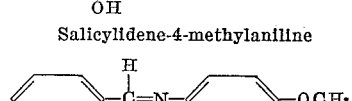
Salicylidene-4-methoxyaniline

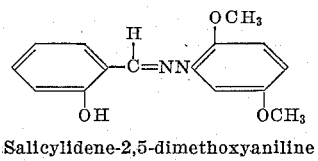

Salicylidene-2,5-dimethoxyaniline

Other useful Schiff bases will become readily apparent to those skilled in the art.

As stated above these compounds are all prepared by condensation of salicylaldehyde and the appropriate amine. The resulting product is then further reacted with a nickel halide or acetate in an alcoholic caustic solution to form the various nickel salts thereof which are the materials contemplated by this invention as light stabilizers in polyolefins either independently or in combination with the phenol esters and/or organic phosphorus compounds.

The amount of nickel compound that may be used to provide suitable polyolefin light stability is substantially between about 0.05 percent to 0.5 percent of the nickel compound based on the weight of the polyolefin. The preferred amount is about 0.1–0.3 percent by weight of the nickel compound.

Although incorporation of the present nickel compounds into the various polyolefins produces a material having vastly increased light resistance, these compounds also impart a yellow to yellow-green color to the said polyolefins. In most cases this slight color will be of little consequence. However, it is possible that the purpose for which a polyolefin is to be used may require that it be almost colorless. This is achieved in the present invention by employing with the nickel compounds a small amount of a phenol ester of an aromatic dicarboxylic acid.

The substituted phenol esters suitable for use in combination with the foregoing novel Schiff bases are fully described in copending application Serial Number 167,940 and the applicable portion of that application is incorporated by reference in this specification. Essentially the phenol esters employed herein are preferably para alkyl monohydric phenol esters of terephthalic acid, or of ring-substituted terephthalic acids. The preferred esters are those obtained by the reaction of (1) a para-alkyl substituted monohydric phenol such as p-nonylphenol, p-octylphenol, p-decylphenol, p-tertiary butylphenol, or p-1,1,3,3-tetramethylbutylphenol and (2) an aromatic dicarboxylic acid such as terephthalic acid or the 2,5 and 6-alkyl (preferably methyl) substituted 1,4-benzenedicarboxylic acids. It is to be noted that the alkyl group in the phenol shall preferably contain at least 8 carbon atoms.

Normally the amount of phenol ester varies from about 0.01 to 1.0 percent by weight based on the weight of the polyolefin. The preferred amount ranges between about 0.3 to 0.4 percent.

As set forth above, suitable organic phosphorus compounds may also be utilized in combination with the above nickel salts of Schiff bases either alone or preferably in combination with a phenol ester as defined previously. It is well known to those skilled in the art that many phosphorus compounds, especially phosphites, including those contemplated by this invention are utilized in polyolefin compositions mainly for anti-oxidation purposes. It has been determined that such organic phosphorus compounds may be substituted for an equivalent amount of phenol ester, either by deliberate addition of the organic phosphorus compound or by utilizing the phosphite already present in the composition and still obtain an enhanced light resistance. The advantage obtained is twofold since the cost of the treated olefin is considerably lessened and the improvement in color, and often of clarity, is frequently greater than that effected by the phenol esters above.

Various other organic phosphorus materials may be utilized instead of the above mentioned phosphites. The most valuable of such alternates are the phosphonates, as hereinafter described.

Typical examples of phosphorus compounds that may be employed in the present resinous composition are trialkyl phosphites, alkylene phosphites, alkyl alkylene phosphites, dialkyl pentaerythrityl diphosphites, glycol tetrol diphosphonates and glycol pentol triphosphonates wherein the glycol is selected from the group consisting of ethylene glycol, diethylene glycol, propylene glycol and dipropylene glycol. However, this list is merely illustrative and other phosphorus compounds can also be satisfactorily utilized in the compositions of this invention.

When the phosphorus compounds are used jointly with the phenol esters they may be present in an amount of about 0.01 to 0.5 percent by weight. The preferred amount being substantially about 0.1 to 0.3 percent.

In some cases, e.g., with ethylene phosphite, the strongly decolorizing effect is associated with a decrease in light stability. This can, however, be overcome by adding a phosphite (e.g., triisodecyl phosphite) which improves light stability without harming color. Thus by proper balance of the ingredients the desired combination of light stability and color can be attained.

It should be noted, however, that in any case where an aromatic group is directly bonded to phosphite oxygen, the effect on light stability is adverse, and there are no redeeming decolorizing properties. Thus, triphenyl phosphite, monoisodecyl diphenyl phosphite and diisooctyl monophenyl phosphite have no value within the purview of this invention.

The invention will now be further illustrated by the following examples. They are intended, however, to be merely illustrative of the invention and not in limitation thereof.

EXAMPLE I

This and the following several examples all demonstrate the general method for preparation of various Schiff bases.

*Salicylidene-4-carboethoxyaniline*

In a flask a mixture was prepared of 47.0 grams (0.385 mole) of salicylaldehyde and 63.5 grams (0.385) of ethyl p-aminobenzoate and 200 grams of toluene. The mixture was refluxed 3½ hours. Upon cooling a yellow solid was obtained which was recrystallized from petroleum ether to give yellow needles of salicylidene-4-carboethoxyaniline. The yield was 87 percent and the melting point of the pure product was between 85–90° C.

EXAMPLE II

*Salicylidene-2,5-dichloroaniline*

Substituting 61.5 grams of 2,5-dichloroaniline for benzocaine in Example I yielded yellow crystals of salicylidene-2,5-dichloroaniline. The yield was substantially 75 percent and melting point of the crude product was between 102–106° C. The melting point of the recrystallized product was between 103–108° C.

EXAMPLE III

*Salicylidene-2-aminopyridine*

Warming 244 grams (2 moles) of salicylaldehyde with 188 grams (2 moles) of 2-aminopyridine to 75–80° C. and then cooling yielded an orange solid, which was recrystallized from isopropanol to give yellow crystals of salicylidene-2-aminopyridine. The yield was substantially 91 percent and the melting point of the crude product was between 64–71° C. The melting point of the recrystallized product was between 65–71° C.

EXAMPLE IV

*Salicylidene-2,5-dimethoxyaniline*

Refluxing a mixture of 54 grams (0.353 mole) of 2,5-dimethoxyaniline, 43 grams salicylaldehyde, and 100 grams of xylene until water evolution ceased, and subsequently boiling off the xylene yielded a solid residue. On recrystallization from petroleum ether, red crystals of the product were obtained. The yield was substantially 100 percent and the melting point of the crude product was between 45 to 50° C., whereas the melting point of the recrystallized product was between 45 to 52° C. An analysis of the recrystallized product showed that carbon was present at 70.23 percent, hydrogen at 5.98 percent and nitrogen at 5.54 percent. Theoretically carbon should be present at 70.1 percent, hydrogen at 5.85 percent and nitrogen at 5.45 percent.

EXAMPLE V

*Salicylidene-4-chloroaniline*

The identical procedure was carried out as in Example I except that 49 grams of 4-chloroaniline were substituted for ethyl p-aminobenzoate. The reaction mixture produced yellow crystals of salicylidene-4-chloroaniline. The yield was 85 percent and the melting point of the crude product was 98–107° C., whereas the recrystallized product had a melting point of 101 to 105° C. Upon analysis the pure product contained 15.5 percent chlorine and 6.1 percent nitrogen. In theory there should be 15.5 percent chlorine and 6.05 percent nitrogen.

The above examples illustrate only a few of Schiff bases that are within the scope of the general formula as set forth earlier in this specification. However, it will be clear to those skilled in the art that other such Schiff bases, which are contemplated by the invention, may be also prepared in a similar manner.

The following several examples will serve to demonstrate the method of converting the Schiff bases into the nickel salts thereof.

EXAMPLE VI

*Nickel salt of salicylidene-4-chloroaniline*

A nickel salt of salicylidene-4-chloroaniline was prepared by reacting 40 grams (1 mole) NaOH with 231 grams (1 mole) of salicylidene-4-chloroaniline in a solution containing 800 milliliters of methanol and 950 milliliters of ethanol. The solution was treated at ambient room temperature with a methanol solution of nickel chloride containing 0.525 mole Ni. The mixture of NaCl and the desired Ni salt were separated from the liquid phase by filtration. The filter cake was slurried in water to dissolve the NaCl. The resulting suspension was filtered, and the precipitate washed free of chlorides. The washed cake was dried to constant weight and was found to provide a 71.5 percent yield having a melting point of 250° C. The yellow-green solid product in theory should contain 11.3 percent Ni, but upon analysis contained 10.95 percent Ni.

EXAMPLE VII

*Nickel salt of salicylidene-4-carboethoxyaniline*

The same procedure was carried out as in Example VI. However, 269 grams of salicylidene-4-carboethoxyaniline was substituted for the Schiff base employed in Example VI. A yellow-green solid containing 9.77 percent Ni was obtained having a melting point of 100 to 138° C., at 40 percent yield. In theory the product should contain 9.85 percent Ni.

EXAMPLE VIII

*Nickel salt of salicylidene-2,5-dichloroaniline*

Substantially 252 grams of salicylidene-2,5-dichloroaniline was substituted for the Schiff base of Example VI and a similar procedure was carried out to give a gold colored solid representing about an 88 percent yield containing 10.54 percent Ni and having a melting point of 250° C. Theoretically the product should contain 10.4 percent Ni.

EXAMPLE IX

*Nickel salt of salicylidene-2-aminopyridine*

In this case 198 grams of salicylidene-2-aminopyridine was used in place of the Schiff base employed in Example I. However, the resulting nickel salt was soluble in the alcohol. The alcohol was removed by evaporation and the residue reslurried in water, washed free of chlorides and dried. The green solid, obtained at 90 percent yield, contained 12.55 percent nickel, and had a melting point of 131–153° C. Theoretically the product should contain 13.0 percent Ni.

EXAMPLE X

*Nickel salt of salicylidene-2,5-dimethoxyaniline*

Here 257 grams of 2,5-dimethoxyaniline is substituted for the Schiff base of Example VI and the same procedure was employed to produce a brown solid constituting a 79 percent yield which contained 9.95 percent nickel and had a melting point of 250° C. Theoretically the product should contain 10.3 percent nickel.

The above examples are included to show the general procedure employed in producing the various nickel salts of Schiff bases. Obviously many other nickel salts of Schiff bases can also be prepared using the same technique.

The value of the additives of the present invention is reported in the following tables. The additives were tested by adding them to the appropriate polyolefin and milling the mixture on a heated 2-roll mill to form a continuous sheet. The rolls were varied in temperature from 325 to 375° F. depending on the melt index and flow characteristics of the resin. The milled sheet was cooled to room temperature, ground to a coarse granular consistency, fed to a small extruder of conventional design, and extruded as a film which after water quenching averaged about 5 mils in thickness. The extruder barrel temperatures were adjusted in the range 350 to 450° F., depending on the extrusion characteristics of the resin. Standard dumbbell-shaped test pieces were cut from the center of the approximately 2 inch wide film so that the long axis of the dumbbell corresponded to the long axis of the film. These pieces were tested for maximum elongation under tension using conventional test equipment. An additive, or additive system was regarded as superior when it favored more prolonged retention of elongation than did the control system. Testing experience reveals that the maximum elongation does not decline uniformly, with increased exposure to ultra-violet light but tends rather to remain constant or decline slowly until a certain critical state of degradation is reached after which the maximum elongation is reduced very rapidly with further exposure. Testing experience also shows that some samples, on exposure to light, reach a level of degradation which renders them too brittle for ordinary testing. It is thereby possible to compare the elongation samples exposed to ultra-violet light by 3 criteria—(a) comparative maximum elongation during the initial period of slow decline; (b) comparative maximum elongation during the period of rapid decline; and (c) the proportion of samples subject to brittle failure, after a fixed period of exposure.

In these tests it was normally necessary to run 5 or 6 replicate samples to obtain reliable data, and all test samples to be compared were exposed at the same time in the same test machine (an Atlas Weather-O-Meter, operated without water sprays).

Using a commercial polypropylene, the effect of varying concentrations of the nickel salt of salicylidene-2-chloroaniline (NiS2CA), the following observations were made (all samples were run in sextuplicate).

TABLE I

| Concentration (percent) (NiS2CA)[1] | Elongation (percent) at 72 hours exposure | Elongation (percent) at 100 hours exposure |
|---|---|---|
| 0.00 | — (6/6) | — (6/6) |
| 0.05 | 555 (4/6) | — (6/6) |
| 0.1 | (2) | 448 (2/6) |
| 0.2 | (2) | 609 (0/6) |
| 0.5 | (2) | 621 (0/6) |
| 1.0 | (2) | 481 (2/6) |

[1] Nickel salt of salicylidene-2-chloroaniline.
[2] Not run.

In these and in subsequent tables, except where otherwise defined, the fraction in parentheses represents the number of brittle failures (numerator) followed by the total number of samples of that set (denominator). The numbers outside the parentheses represent the average percent elongation of those samples which did not experience brittle failure.

It is clear from the samples given that all concentrations of NiS2CA from 0.05 percent to 1.0 percent, and by reasonable extrapolation from 0.02 to 2.0 percent confer some advantage over 0 percent. However, the best performance was observed at 0.2 to 0.5 percent.

All samples of this type have, prior to ultra-violet exposure, maximum elongations typically in the range 500 to 600 percent.

The nickel salt of a suitable Schiff base may be combined with a bis(alkylphenyl)terephthalate to achieve certain advantages. The most obvious is that of reduction of color, since the nickel salt is invariably colored, and at 0.5–0.6 percent imparts a color too intense for most applications. A replacement of part of the nickel salt by a terephthalate ester of the type previously described, reduces the color intensity, and as is shown in Table II, actually improves the light stability. The resin in this case is polypropylene. The nickel salt in this case is of salicylidene-4-chloroaniline and the terephthalate ester is bis(nonylphenyl)terephthalate.

It is to be noted that while the bis(nonylphenyl) terephthalate has some merit per se, its principal value is in amplifying and extending the stabilization of the nickel salt. Thus No. 7 in Table II gives better performance than any other combination at equal or lower total stabilizer concentrations.

TABLE III

Percent elongation after 100 hrs. exposure (1) Nickel salt of salicylidene-2-chloroaniline _____ 570 (0/6)
(2) Nickel salt of salicylidene-3,4-dichloroaniline _____ 538 (0/6)
(3) Nickel salt of salicylidene-2,5-dimethoxyaniline _____ 527 (0/6)
(4) Nickel salt of salicylidene-4-methoxyaniline _____ 526 (0/6)
(5) Nickel salt of salicylidene-p-chloroaniline _____ 524 (0/6)
(6) Nickel salt of salicylidene-4-carboethoxyaniline _____ 523 (1/6)
(7) Nickel salt of salicylidene-4-methylaniline _____ 506 (0/6)
(8) Nickel salt of salicylidene-2-aminopyridine _____ 471 (0/6)
(9) Nickel salt of salicylidene-2,5-dichloroaniline _____ 465 (0/6)

Thus while the nickel salts vary in efficacy with the structure of the balance of the molecule, a great variety of such salts are useful.

It has been additionally observed that certain organic phosphorus compounds may be useful co-contributors to the value of the composition of this invention. In some cases they aid light stability by improving percent elongation.

Thus from Table IV below it will be noted that in the polypropylene system the addition of 0.1 percent of triisodecyl phosphite increases the percent elongation of No. 7 in Table III from 506 percent (0/6) to 559 percent (0/6), and of item No. 3 from 527 percent (0/6) to 608 percent (0/6).

TABLE IV

| Ni salt of 2,5-dimethoxyaniline Schiff base | Ni salt of 4-methylaniline Schiff base | Terephthalate ester [1] | Triisodecyl phosphite | Percent Elongation after 102 hr. exposure |
|---|---|---|---|---|
| 0.1 | ---------- | 0.3 | ---------- | 527 (0/6) |
| 0.1 | ---------- | 0.3 | 0.1 | 608 (0/6) |
| ---------- | 0.1 | 0.3 | ---------- | 506 (0/6) |
| ---------- | 0.1 | 0.3 | 0.1 | 559 (0/6) |

[1] Bis(nonylphenyl)terephthalate.

TABLE II

| No. | Percent Nickel salt | Percent Ester [1] | Percent Total Additive | Elongation (Percent) At 0 hrs. exposure | Elongation (Percent) At 72 hrs. exposure | Percent Retained of original elongation |
|---|---|---|---|---|---|---|
| 1 | 0.0 | 0.0 | 0.0 | 563 | — (5/5) | ---------- |
| 2 | 0.0 | 0.2 | 0.2 | 604 | — (5/5) | ---------- |
| 3 | 0.0 | 0.4 | 0.4 | 590 | 340 (0/5) | 58 |
| 4 | 0.0 | 0.6 | 0.6 | 665 | 426 (0/5) | 64 |
| 5 | 0.2 | 0.0 | 0.2 | 629 | 277 (2/5) | 43 |
| 6 | 0.2 | 0.2 | 0.4 | 554 | 383 (0/5) | 61 |
| 7 | 0.2 | 0.4 | 0.6 | 584 | 562 (0/5) | 96 |
| 8 | 0.4 | 0.0 | 0.4 | 624 | 527 (0/5) | 85 |
| 9 | 0.4 | 0.2 | 0.6 | 570 | 533 (0/5) | 93 |
| 10 | 0.6 | 0.0 | 0.6 | 619 | 441 (0/5) | 71 |

[1] Bis(nonylphenyl)terephthalate.

Examples of the utility of Ni salts of various Schiff bases are given in the following table where the Ni salt is used at 0.1 percent (by weight of the resin, in this case polypropylene), and the bis(nonylphenyl)terephthalate is used therewith at 0.3 percent.

While the above compositions employed triisodecyl phosphite, any of the other phosphites and related organic phosphorus compounds set forth in the specification can also be used.

Additional examples of the utility of various organic phosphorus compounds are shown in Table V below. The resin employed in this system is polypropylene.

TABLE V

| | Ni salt of o-chloro-aniline Shiff base | Terephthalate ester [1] | Phosphorus compound | Concentration of Phosphorus compd. | Percent Elongation after 100 hr. exposure |
|---|---|---|---|---|---|
| (1) | 0.1 | 0.3 | Triisodecyl phosphite | 0.1 | 518 (1/6) |
| (2) | 0.1 | 0.3 | {Triisodecyl phosphite<br>{Plus ethylene phosphite | 0.05<br>0.05 | 547 (3/6) |
| (3) | 0.1 | 0.3 | Trilauryl phosphite | 0.1 | 570 (4/6) |
| (4) | 0.1 | 0.3 | Diisopropylene glycol pentol triphosphonate | 0.1 | 500 (3/6) |
| (5) | 0.1 | 0.3 | Distearyl pentaerythrityl diphosphite | 0.1 | 630 (0/6) |

[1] The terephthalate ester in each example was bis(nonylphenyl)terephthalate except in Example 5 where it was bis(octylphenyl)terephthalate.

In the above table, the polypropylene without additives had completely failed in all cases at less than 72 hours.

In addition to the use of phosphorus compounds as contemplated by this invention as an aid to light stability, their employment is particularly valuable as a means of reducing color of the resinous composition containing the nickel salt. Thus, for example, even minute amounts of ethylene phosphite (e.g., 0.05–0.1 percent) virtually eliminate all observable discoloration from compositions containing 0.2–0.3 percent of the nickel Schiff base salts. Similarly strongly decolorizing effects have been noted with distearyl pentaerythrityl diphosphite and with dipropylene glycol pentol triphosphonate, of the type described in U.S. Patent 3,081,331.

As homologous substitutes for bis(nonylphenyl)terephthalate, only those with at least 8 carbon atoms in the alkyl group are effective enough to be useful.

Examples of numerous terephthalates that are within the scope of this invention are given below in which 0.1 percent by weight of the resin of Ni salt of salicylidene-2-chloroaniline Schiff base is employed and the terephthalate ester is used therewith at 0.3 percent. Triisodecyl phosphite is incorporated at 0.1 percent and the resin is polypropylene.

TABLE VI

| Alkyl group in bis(alkylphenyl) terephthalate | Percent Elongation | |
|---|---|---|
| | At 72 hours | At 100 hours |
| Tertiary butyl | 570 (2/6) | — (6/6) |
| Tertiary octyl | 563 (0/6) | 120 (5/6) |
| Secondary isononyl [1] | | 518 (1/6) |
| Tertiary dodecyl | | 404 (2/6) |

[1] This is identical with the compound referred to previously as bis(nonylphenyl)terephthalate.

Thus the above results indicate that the applicant's invention will also show improved results with terephthalate esters other than bis(nonylphenyl)terephthalate.

The merits of this invention are also demonstrated by a resin sold by the Phillips Petroleum Company under the tradename Marlex 5012 believed to be a copolymer of ethylene and butene-1. The use of 0.2 percent nickel salt of salicylidene-4-chloroaniline and 0.3 percent bis(nonylphenyl)terephthalate in the said copolymer gave an average of 734 percent elongation after 200 hours exposure, which was 97 percent retention of the original elongation (at 0 hours exposure). In the absence of these additives the copolymer resin declined to about 70 to 80 percent of its original elongation after 200 exposure hours.

The invention as set forth above will also stabilize other polyolefin resins, equally well against the deteriorating effects of ultra-violet light.

It is to be noted that other ingredients may be added to the compositions of the present invention, such as antioxidants, chelators and other types of heat stabilizers; pigments; fillers; other light stabilizers; etc. without substantially altering the manner in which the compositions of this invention operate.

Numerous other modifications and variations in the invention described herein will be apparent to those skilled in the art, and are within the spirit and scope of the appended claims.

It is therefore, particularly pointed out and distinctly claimed as the invention:

1. A polyolefin containing in intimate admixture therewith (a) from about 0.2 to 0.5 percent by weight of a nickel salt of a Schiff base having the general formula:

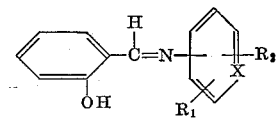

wherein $R_1$ and $R_2$ are selected from the group consisting of hydrogen, halogen, alkoxy, and carboalkoxy, and X is selected from the group consisting of CH and N; and (b) from about 0.2 to about 1.0 percent by weight of bis(alkylphenyl)terephthalate the total percent by weight of said nickel salt of a Schiff base, and the total percent by weight of said bis(alkylphenyl)terephthalate, being together, at least 0.6 percent by weight, which act in said polyolefin to preserve the stability thereof to light.

2. A polyolefin as defined in claim 1 in which the polyolefin is polypropylene.

3. A polyolefin as defined in claim 1 in which the polyolefin is a co-polymer of ethylene and butylene.

4. A polyolefin as defined in claim 1 in which the terephthalate is bis(nonylphenyl)terephthalate.

5. A polyolefin containing in intimate admixture therewith (a) from about 0.2 to 0.5 percent by weight of a nickel salt of a Schiff base having the general formula:

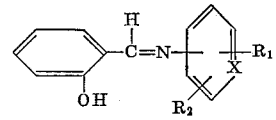

wherein $R_1$ and $R_2$ are selected from the group consisting of hydrogen, halogen, alkoxy, and carboalkoxy, and X is selected from the group consisting of CH and N; and (b) from about 0.2 to 1.0 percent by weight of bis(alkylphenyl)terephthalate the total percent by weight of said nickel salt of a Schiff base, and the total percent by weight of said bis(alkylphenyl)terephthalate constituting, together, at least 0.6 percent by weight; and (c) from about 0.1 to 0.5 percent by weight of a non-aromatic organophosphorus ester.

6. A polyolefin as defined in claim 5 in which the polyolefin is polypropylene.

7. A polyolefin as defined in claim 5 in which the polyolefin is a co-polymer of ethylene and butene.

8. A polyolefin as defined in claim 5 in which the terephthalate is bis(nonylphenyl)terephthalate.

9. A polyolefin as defined in claim 5 in which the organic phosphite ester is triisodecyl phosphite.

References Cited by the Examiner

UNITED STATES PATENTS

| 3,167,526 | 1/1965 | Nicholson | 260—45.75 |
| 3,248,248 | 4/1966 | Coran et al. | 260—45.85 |

FOREIGN PATENTS 1,147,753  4/1963  Germany.

LEON J. BERCOVITZ, *Primary Examiner.*

DONALD E. CZAJA, *Examiner.*

G. W. RAUCHFUSS, *Assistant Examiner.*